UNITED STATES PATENT OFFICE 2,124,690

BROWN WOOL DYE

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application March 25, 1937, Serial No. 132,970

13 Claims. (Cl. 260—81)

This invention relates to azo dyestuffs, to processes of making the dyestuffs and to materials dyed therewith, and especially to hydroxy secondary disazo dyes, their esters and ethers.

Heretofore brown azo dyes suitable for dyeing wool have been described which resemble in some respects the dyes hereinafter to be described. However, they have various undesirable properties, being sensitive to alkali and showing a tendency to bleeding when wet. In general it is necessary to dye with them in acid baths. It is useful to have wool dyes which will operate in neutral baths, and it is desirable to provide new dyestuffs with improved properties and processes for producing the compounds.

It is an object of this invention to provide new dyes suitable for dyeing animal fibres, such as silk and wool, in neutral baths. Another object of the invention is to provide new wool dyes of desirable bright shades having good fastness to washing and fulling. Another object of the invention is to provide processes for making the new compounds. Other objects are to provide animal fibres dyed with the new compounds and processes of dyeing the same. Still other objects will be apparent from the following more detailed description of the invention.

The objects of the invention are accomplished generally by the following procedure. A diazotized 4-nitro-4'-amino-diphenylamine-sulphonic acid is coupled to a coupling component which is devoid of sulphonic acid groups. This coupling component must have a free coupling position non-adjacent to the amino group and must be capable of diazotization after the monazo compound is formed. The monazo compound is diazotized and coupled with a hydroxy aryl compound. Finally the end hydroxyl of the disazo compound is blocked by forming an ester or an ether by condensation with a blocking agent.

The term aryl as used in the specification and claims refers generally to aromatic compounds of the benzene and naphthalene series.

The invention is illustrated but not limited by the following examples.

Example I 30.9 parts of 4-nitro-4'-amino-diphenylamine-2-sulfonic acid were dissolved in 500 parts of water at 60° C. with 5.3 parts of sodium carbonate and then 6.9 parts of sodium nitrite were added to the solution. This solution was then run during 30 minutes into 250 parts of normal HCl solution and enough ice was added to keep the temperature at 25–30° C.

21 parts of sodium acetate (crystals) were then added to the mixture containing the diazotized 4-nitro-4'-amino-diphenylamine-2-sulphonic acid, and to this was added a solution containing 13.7 parts of cresidine (3-amino-4-methoxy toluene) in 200 parts of water and 50 parts of 2X normal HCl solution. After stirring for one hour 150 parts of 2X normal sodium carbonate solution were added to make the solution slightly alkaline. The monazo compound was then salted out with about 200 parts of sodium chloride. It was filtered and washed with 15% sodium chloride solution. The residue was dissolved in 500 parts of water at 90° C. and filtered with charcoal, to remove the excess cresidine.

This amino azo compound was then diazotized at 10° C. by adding 30 parts of 10X normal hydrochloric acid solution and 50 parts of 2X normal sodium nitrite solution and stirring for one hour. This diazo compound was then coupled with phenol in a solution containing 9.4 parts of phenol and 10 parts of 10X normal sodium hydroxide solution and 60 parts of 2X normal sodium carbonate solution in 500 parts of water. When the coupling was complete the dye was salted out at 70° C. with 10% sodium chloride, removed by filtration and dried. This product dyed wool an orange brown shade and is represented by the following formula:

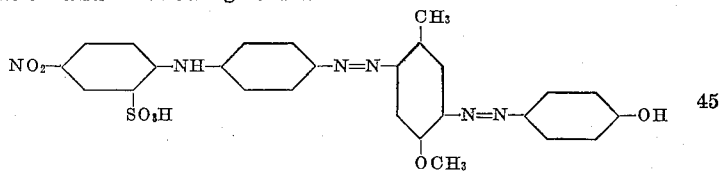

Different portions of the compound were condensed with para-toluene sulfon chloride and with diethyl sulfate by treatment at 60-70° C. in an alkaline solution and the ester and ether were obtained. These products dyed wool orange brown shades of good fastness to washing, fulling and alkaline perspiration.

These compounds are represented by the following formulae:

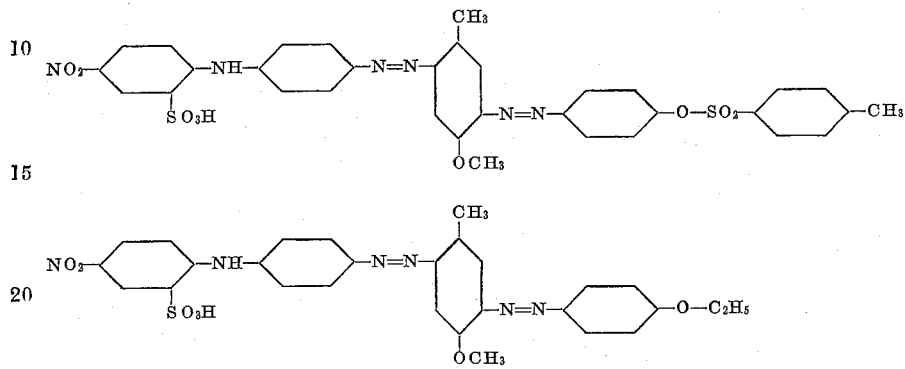

Example II

By using alpha-napththylamine instead of cresidine as in Example I, a brown dye was obtained which is represented by the following formula

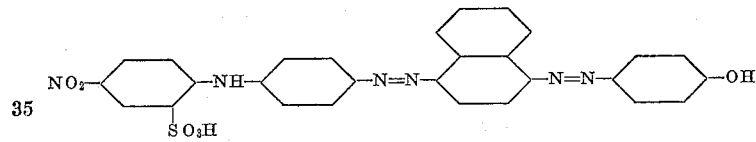

One portion of this disazo dye was condensed with paratoluene-sulphon-chloride and another portion was alkylated with dimethyl sulphate. The latter dyes were less sensitive to alkalies than the uncondensed disazo compounds. The products gave shades of brown dyeings on wool.

The products are represented by the following formulae

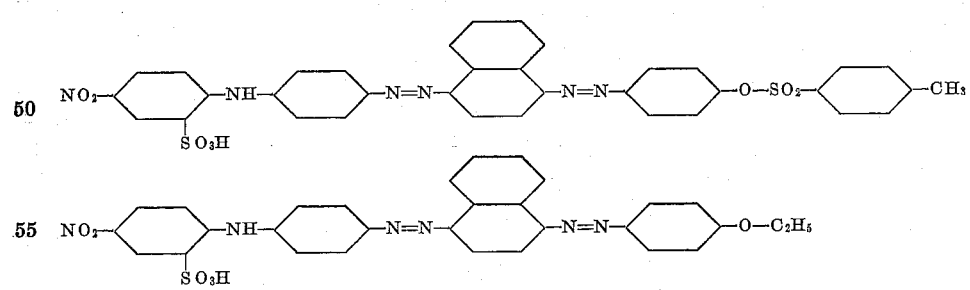

Example III 30.9 parts of 4-nitro-4'-amino-diphenylamine-2-sulphonic acid were dissolved in 400 parts of water with 50 parts of 2 normal sodium hydroxide solution. This solution was added during 45 minutes to 250 parts of normal hydrochloric acid solution with good agitation, at room temperature. The excess mineral acid was then neutralized with 7 parts of sodium acetate crystals. 10.8 parts of meta-toluidine were dissolved in 100 parts of normal hydrochloric acid solution, and this was then added to the diazo suspension. During 1 hour 50 parts of 2 normal sodium carbonate solution were added and stirring was continued until the coupling was complete. The monazo combination was filtered off, then redissolved in 500 parts of water with 40 parts of 2 normal sodium carbonate. This solution was clarified with charcoal.

After cooling to room temperature the amino azo compound was diazotized by adding 100 parts of 2 normal hydrochloric acid solution and 40 parts of 2 normal sodium nitrite solution. After stirring one-half hour 9 parts of phenol and 80 parts of 2 normal sodium hydroxide solution were added. The disazo color was salted out and filtered.

The disazo color was redissolved in 600 parts of hot water, filtered and treated at 60-70° with 100 parts of 2 normal sodium carbonate solution and 20 parts of para toluene sulfon chloride.

After cooling to 20° the esterified product was salted out and filtered.

The product dyed wool, pure silk, tin weighted silk and acetate silk from a neutral bath a yellow brown of good fastness properties. Its constitution may be represented by the following formula:

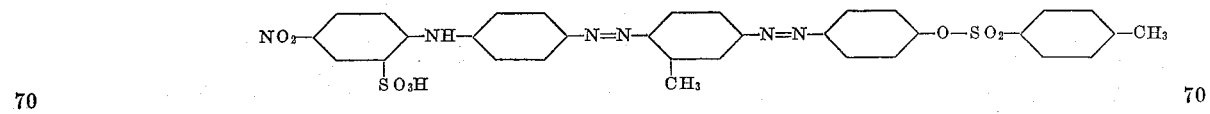

Example IV

An esterified disazo color made by the same process as in Example III but using 15.4 parts of dimethoxy aniline in place of 10.8 parts of meta-toluidine gave a chestnut brown dyeing on wool, pure silk and acetate silk. Its probable structural formula is

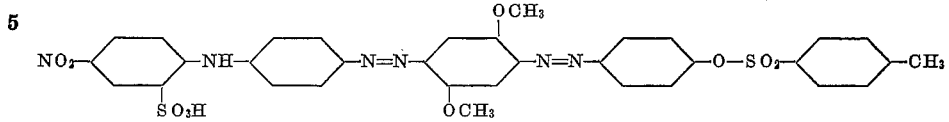

The dyes of this invention are generally soluble and they may be used without dispersing agents to dye acetate silk from water solutions.

Considerable variation in the constituents used in preparing the dyes of the invention may be made. Thus some of the properties of the dyes are varied. For the first component an isomer of the nitro-amino-diphenylamine-sulphonic acid mentioned in the examples can be used. The nitro-amino-diphenylamine-sulphonic acid may be substituted by other groups such as alkyl, alkoxy, halogen, nitro and another sulphonic acid group. In diazotizing the first component it is preferable to add the nitrite to an alkaline solution of the nitro-amino-diphenylamine-sulphonic acid and then add this mixture to a mineral acid solution as more specifically described in the examples.

The first coupling or middle component consists of a member of the type of primary aryl amino derivatives, ordinarily used as middle components in secondary disazo dyes. The coupling must take place in a position that is not adjacent to the primary amino group and the amino group must be capable of being diazotized after the coupling. Other substituent groups may be present, such as alkyl, alkoxy, acyl-amino (=NH acyl), aryl, halogen and carboxyl so long as they do not interfere with the coupling and subsequent diazotization of the monazo compound. Among the intermediates which may be used are aniline (coupled by means of its omega-sulphonic-acid derivative), meta-toluidine, cresidine, 2:5-dimethoxy-aniline, alpha-naphthylamine, 2-amino-6-naphthols and 2-amino-7-naphthols. It is preferred to use as the second component a primary aryl amine having a free coupling position para to the amino group.

For the end coupling component hydroxy aryl compounds of the benzene and naphthalene series and their substituted products can be used. These compounds may be substituted by a variety of groups so long as the groups do not interfere with the coupling, such as alkyl, alkoxy, halogen, amino, carboxy and sulphonic acid. As examples of such compounds are mentioned 3-hydroxy-anisol and resorcin, but phenols and substituted phenols have given the best results.

The preferred mode of protecting or blocking the hydroxyl of the end group of the disazo compound comprises the condensation of the hydroxyl with compounds to form ester and ether groups. By blocking is meant the conversion of the hydroxyl group to a neutral unionizable group, that is incapable of forming alkali salts with alkaline substances. Esters are preferably formed by condensing with alkyl or aryl sulphonic acid compounds, such as aryl-sulfon-halides or with an acylating compound, i. e. compounds which introduce —CO=alkyl or —CO=aryl groups. Examples are alkyl or aryl carboxylic acid compounds, such as acetic anhydride or an aroyl halide. Ethers are formed by condensing with alkylating compounds, such as dialkyl sulphates and alkyl halides.

The aryl-sulfon-halide may be a benzene or naphthalene derivative and may be substituted as by an alkyl group. Aroyl halides containing a benzene or naphthalene nucleus can be used. For example, benzoyl bromide or 2-naphthoyl chloride can be used instead of p-nitro-benzoyl-chloride.

The alkyl group present in the alkylating or in the acylating compound may contain from 1 to 12 carbon atoms, but preferably contains 1 to 3 carbon atoms.

The following general formula represents the constitution of the preferred combinations:

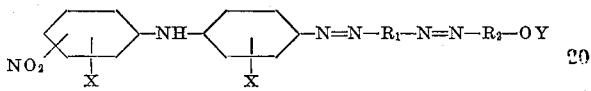

where one X represents —H and the other represents —SO$_3$H. R$_1$ is an unsubstituted or substituted benzene or naphthalene nucleus devoid of sulphonic acid groups. R$_2$ is the residue of a hydroxy aryl compound and Y is alkyl, acyl or —SO$_2$ aryl.

For the purposes of dyeing silk and wool in neutral baths the esters and ethers of the disazo compounds are preferred, such as those in which the hydroxy of the end component is protected by condensation with an aryl sulphon halide, an aroyl halide or an alkyl sulphate. In preparing the disazo compound the best results are obtained by isolating the monazo product from a neutral or alkaline solution.

For dyeing 100 parts of wool in neutral bath about 1 part of dye may be used in a solution containing about 10 parts of sodium sulphate crystals in 100 parts of water. The procedure may desirably consist of turning over the wool in the solution for about 10 minutes at room temperature, heating the dye bath over a period of about 15 minutes to a temperature approximating 90° to 100° C. and holding the solution at this temperature whilst turning over the wool therein for about 30 minutes. The material is then taken out.

In preparing the monazo compounds in acid coupling medium it is to be understood that neutralization of the free acid therein before separating the monazo compound is not essential since this compound can be separated from the acidic medium. However, we prefer to make this coupling medium non-acid, that is neutral or alkaline before separating the monazo compound since it has been found that the preferred procedure as recited in the examples results in the production of purer and brighter intermediate and end products than are produced when the monazo compound is separated from the acid medium.

As numerous variations besides those which have been specifically mentioned can be made without departing from the spirit and scope of the invention as will be understood by those skilled in the art, it is to be understood that no limitations are intended in the annexed claims except those which are specifically recited or are imposed by the prior art.

We claim:

1. A compound made by coupling in a para position to the amino group a primary aryl amine devoid of a sulphonic acid group with a diazotized 4-nitro-4'-amino-diphenylamine-sulphonic acid, diazotizing said product of coupling and coupling the same with a hydroxy aryl compound, and condensing said disazo compound with an agent adapted to block the hydroxyl group.

2. A compound made by coupling in a para position to the amino group a primary aryl amine devoid of a sulphonic acid group substituted by at least one of the group consisting of alkyl, alkoxy, halogen, acyl-amino and carboxy with a diazotized 4-nitro-4'-amino-diphenylamine-sulphonic acid, diazotizing said product of coupling and coupling the same with a hydroxy aryl compound, and condensing said disazo compound with an agent adapted to block the hydroxyl group.

3. A compound made by coupling in a para position to the amino group a primary aryl amine devoid of a sulphonic acid group with a diazotized 4-nitro-4'-amino-diphenylamine-sulphonic acid substituted by at least one of the group consisting of alkyl, alkoxy, halogen, nitro, and sulphonic acid, diazotizing said product of coupling and coupling the same with a hydroxy aryl compound, and condensing said disazo compound with an agent adapted to block the hydroxyl group.

4. A compound made by coupling in a para position to the amino group a primary aryl amine devoid of a sulphonic acid group with a diazotized 4-nitro-4'-amino-diphenylamine-sulphonic acid, diazotizing said product of coupling and coupling the same with a hydroxy aryl compound substituted by at least one of the group consisting of alkyl, alkoxy, halogen, amino, sulphonic acid and carboxy, and condensing said disazo compound with an agent adapted to block the hydroxyl group.

5. A compound made by coupling in a para position to the amino group a primary aryl amine devoid of a sulphonic acid group with a diazotized 4-nitro-4'-amino-diphenylamine-sulphonic acid, diazotizing said product of coupling and coupling the same with a hydroxy aryl compound, and condensing said disazo compound with one of a group consisting of an alkylating compound, an acylating compound and a hydrocarbon sulfon halide.

6. A compound made by coupling a diazotized 4 - nitro - 4'-amino -diphenylamine- 2 -sulphonic acid with a primary aryl amine which is devoid of a sulphonic acid group having a free coupling position non-adjacent to an amino group and which is diazotizable when coupled, diazotizing said product of coupling, coupling the same with a hydroxy aryl compound, and condensing said disazo compound with an agent adapted to block the hydroxyl group.

7. A compound represented by the formula

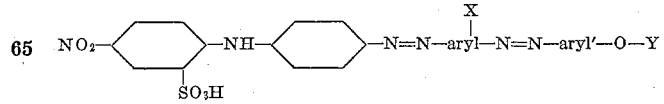

in which aryl is the residue of an aryl amine of the group consisting of benzene and naphthalene and coupled in a position para to the amino group, X is at least one of a group consisting of hydrogen, alkyl, alkoxy, halogen, acyl amino and carboxy, aryl' is the residue of a hydroxy compound of the group consisting of a hydroxy benzene, and a hydroxy naphthalene, Y is a residue of a compound of the group consisting of a hydrocarbon sulfon halide, an acylating compound and an alkylating compound.

8. A compound represented by the formula

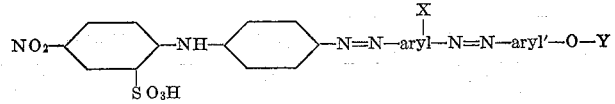

in which aryl is the residue of an aryl amine of the group consisting of primary amines of benzene and naphthalene to which are connected the azo bridges in para positions, X is at least one of a group consisting of hydrogen, alkyl, alkoxy, halogen, acyl amino and carboxy, aryl' is the residue of a hydroxy benzene compound, and Y is a residue of a compound of the group consisting of a hydrocarbon sulfon halide, an acylating compound and an alkylating compound.

9. The process which comprises coupling a diazotized 4-nitro-4'-amino-diphenylamine-sulphonic acid and an aryl amine selected from the group consisting of benzene and naphthalene derivatives in a coupling position of said aryl amine which is non-adjacent to the amino group, diazotizing the product of coupling, coupling said product of coupling in alkaline reaction medium with an hydroxy compound selected from the group consisting of the hydroxy benzenes and their derivatives, and the hydroxy naphthalenes and their derivatives, and condensing the disazo compound with one of the group consisting of an alkylating compound, an acylating compound and a hydrocarbon sulfon chloride.

10. The compound represented by the formula

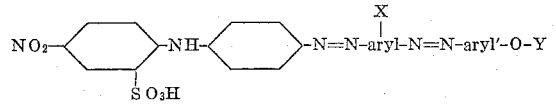

in which aryl is the residue of an arylamine of the group consisting of primary amines of benzene and naphthalene to which are connected the azo bridges in para positions, X is at least one of a group consisting of hydrogen, alkyl, alkoxy, halogen, acyl-amino and carboxy, aryl' is the residue of a hydroxy benzene compound, and Y is a residue of a compound of the group consisting of a hydrocarbon sulfon halide.

11. A compound represented by the formula

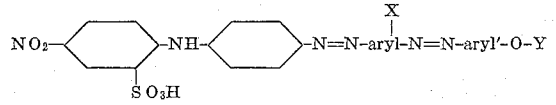

in which aryl is the resude of an arylamine of the group consisting of primary amines of benzene and naphthalene to which are connected the azo bridges in para positions, X is at least one of the group consisting of hydrogen, alkyl, alkoxy, halogen, acylamino and carboxy, aryl' is the residue of one of the group consisting of phenol and an alkyl substituted phenol and Y is the residue of an aryl sulfon halide.

12. A compound represented by the formula

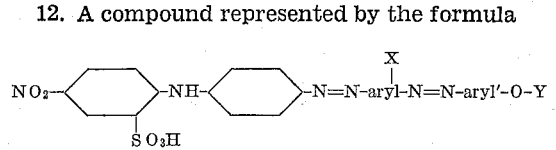

in which aryl is the residue of an arylamine of the group consisting of primary amines of benzene and naphthalene to which are connected the azo bridges in para positions, X is at least one of the group consisting of hydrogen, alkyl, alkoxy, halogen, acylamino and carboxy, aryl' is the residue of phenol and Y is the residue of an aryl sulfon halide.

13. A compound represented by the formula

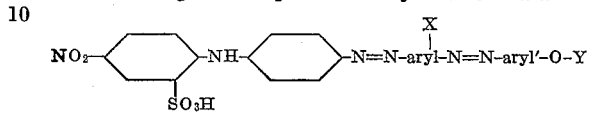

in which aryl is the residue of an arylamine of the group consisting of primary amines of benzene and naphthalene to which are connected the azo bridges in para positions, X is at least one of the group consisting of hydrogen, alkyl, alkoxy, halogen, acylamino and carboxy, aryl' is the residue of xylenol and Y is the residue of an aryl sulfon halide.

HERBERT W. DAUDT.
HAROLD E. WOODWARD.